(12) United States Patent
Iwata et al.

(10) Patent No.: US 7,255,383 B2
(45) Date of Patent: Aug. 14, 2007

(54) VEHICULAR ELECTRICAL DISENGAGING DOOR LATCH APPARATUS

(75) Inventors: Takeharu Iwata, Fujisawa (JP); Shingo Gotou, Atsugi (JP); Osamu Hamaguchi, Yokohama (JP); Jiro Inoue, Nagoya (JP); Shintaro Okawa, Yokohama (JP)

(73) Assignees: Nissan Motor Co., Ltd. (JP); Mitsui Mining and Smelting Co., Ltd. (JP); Ohi Seisakusho Co., Ltd. (JP)

( * ) Notice: Subject to any disclaimer, the term of this patent is extended or adjusted under 35 U.S.C. 154(b) by 0 days.

(21) Appl. No.: 11/194,362

(22) Filed: Aug. 1, 2005

(65) Prior Publication Data

US 2006/0061194 A1    Mar. 23, 2006

(30) Foreign Application Priority Data

Aug. 4, 2004    (JP)    ............................ P2004-227984

(51) Int. Cl.
B60N 2/02    (2006.01)
(52) U.S. Cl. .................................... 296/65.01; 292/216
(58) Field of Classification Search ............. 296/65.01, 296/146.1
See application file for complete search history.

(56) References Cited

U.S. PATENT DOCUMENTS

| | | | | |
|---|---|---|---|---|
| 3,999,791 A | * | 12/1976 | Torii ............................ | 292/216 |
| 4,492,395 A | * | 1/1985 | Yamada ........................ | 292/216 |
| 4,785,907 A | * | 11/1988 | Aoki et al. .................. | 180/274 |
| 4,805,723 A | * | 2/1989 | Aoki et al. .................. | 180/289 |
| 4,842,313 A | * | 6/1989 | Boyko et al. ................ | 296/155 |
| 4,968,074 A | * | 11/1990 | Yamagishi et al. .......... | 292/201 |
| 4,995,654 A | * | 2/1991 | Nishigami et al. .......... | 292/216 |
| 5,125,698 A | * | 6/1992 | Thau ........................... | 292/216 |
| 5,209,531 A | * | 5/1993 | Thau ........................... | 292/216 |
| 5,253,906 A | * | 10/1993 | Rogers et al. .............. | 292/216 |
| 5,449,214 A | * | 9/1995 | Totani ........................ | 296/68.1 |
| 5,582,448 A | * | 12/1996 | Inoue ....................... | 292/336.3 |
| 5,613,716 A | * | 3/1997 | Cafferty ..................... | 292/216 |
| 5,615,564 A | * | 4/1997 | Inoue ......................... | 70/279.1 |
| 5,666,834 A | * | 9/1997 | Inoue ........................... | 70/237 |
| 5,715,713 A | * | 2/1998 | Aubry et al. ................. | 70/277 |
| 5,868,451 A | * | 2/1999 | Uno et al. ............... | 296/65.05 |
| 5,927,794 A | | 7/1999 | Mobius et al. | |
| 5,996,381 A | * | 12/1999 | Yoneyama ................... | 70/237 |

(Continued)

FOREIGN PATENT DOCUMENTS

DE    196 49 377 A1    11/1997

(Continued)

*Primary Examiner*—Kiran B. Patel
(74) *Attorney, Agent, or Firm*—Kilpatrick Stockton LLP (57) ABSTRACT

A vehicular electrical disengaging door latch apparatus includes: a striker provided in one of a vehicle main body and a door of a vehicle; a door latch module provided in one of the door and the vehicle main body so as to freely engage with and disengage from; a latch disengaging module capable of electrically disengaging the door latch module; a control module capable of controlling the latch disengaging module; and a door-open operating module capable of mechanically disengaging the door latch module by another transmitting module other than the latch disengaging module, especially, the door-open operating module is located at one of a lower side of a seat cushion of an occupant seat and a floor member opposing to the occupant seat.

9 Claims, 5 Drawing Sheets

U.S. PATENT DOCUMENTS

| | | | |
|---|---|---|---|
| 6,000,257 A * | 12/1999 | Thomas | 70/279.1 |
| 6,045,168 A * | 4/2000 | Johnson et al. | 292/216 |
| 6,079,757 A * | 6/2000 | Aubry | 292/201 |
| 6,253,834 B1 | 7/2001 | Nakagome | |
| 6,382,686 B1 * | 5/2002 | Ishigaki et al. | 292/201 |
| 6,471,266 B1 * | 10/2002 | Yi | 292/346 |
| 6,554,328 B2 | 4/2003 | Cetnar et al. | 292/201 |
| 6,584,643 B1 * | 7/2003 | Tomaiuolo | 16/110.1 |
| 6,595,587 B2 * | 7/2003 | Konishi et al. | 296/65.01 |
| 6,880,866 B2 * | 4/2005 | Tomaszewski et al. | 292/216 |
| 6,955,389 B2 * | 10/2005 | Suzuki et al. | 296/146.4 |
| 7,003,915 B2 * | 2/2006 | Yokomori | 49/360 |
| 7,059,654 B2 * | 6/2006 | Ichinose | 296/146.1 |
| 7,080,861 B2 * | 7/2006 | Watanabe | 292/216 |
| 2001/0005080 A1 * | 6/2001 | Inoue | 292/216 |
| 2002/0074808 A1 * | 6/2002 | Inoue | 292/216 |
| 2004/0174022 A1 * | 9/2004 | Inoue | 292/216 |
| 2004/0256901 A1 * | 12/2004 | Nakaya et al. | 297/378.1 |
| 2005/0161968 A1 * | 7/2005 | Rashidy et al. | 296/65.09 |
| 2006/0061194 A1 * | 3/2006 | Iwata et al. | 297/452.18 |
| 2006/0076788 A1 * | 4/2006 | Gotou et al. | 292/336.3 |

FOREIGN PATENT DOCUMENTS

| | | |
|---|---|---|
| EP | 0 693 603 A1 | 1/1996 |
| EP | 0 710 755 A1 | 5/1996 |
| EP | 1 094 182 A2 | 4/2001 |
| FR | 2 842 852 A | 1/2004 |
| JP | 58-186821 A | 10/1983 |
| JP | 63-146066 | 9/1988 |
| JP | 1-271590 A | 10/1989 |

* cited by examiner

VEHICULAR ELECTRICAL DISENGAGING DOOR LATCH APPARATUS

BACKGROUND OF THE INVENTION

1. Field of the Invention

The present invention relates to a vehicular electrical disengaging door latch apparatus.

2. Description of the Related Art

As a vehicular electrical disengaging door latch apparatus for opening a door of a vehicle, there is a mechanical lock canceling mechanism which can mechanically disengage a latch of the electrical disengaging latch apparatus even if an electric actuator for opening fails to be operated due to a deterioration of a battery or the like with respect to the electric actuator for opening (for example, Japanese Utility Model Application Laid-Open No. 63-146066).

However, in the prior art mentioned above, since a door-open operating means of the mechanical lock canceling mechanism is attached near a waist line of the door, there is a risk that the door-open operating means can be easily operated only by forming a small space capable of inserting a hand, a tool or the like into a passenger room from an exterior side of the passenger room by breaking a window or the like. Accordingly, an improvement is required.

SUMMARY OF THE INVENTION

The present invention has been achieved with such points in mind.

It therefore is an object of the present invention to provide a vehicular electrical disengaging door latch apparatus which can not operate a door-open operating means of a mechanical lock canceling mechanism by forming a small space capable of inserting a hand, a tool or the like into the passenger room from the outside of the passenger room.

In order to achieve the object, according to a first aspect of the present invention, there is provided a vehicular electrical disengaging door latch apparatus comprising at least: a striker provided in a vehicle main body or a door; a door latch means provided in the door or the vehicle main body so as to freely engage with and disengage from the striker; a latch disengaging means capable of electrically disengaging the door latch means; a control means capable of controlling the latch disengaging means; and a door-open operating means capable of mechanically disengaging the door latch means by other transmitting means than the latch disengaging means, wherein the door-open operating means is arranged in a lower side of a seat cushion of an occupant seat or in a floor member opposing to the occupant seat.

According to the invention as stated in the first aspect, since the door-open operating means is arranged in the lower side of the seat cushion of the occupant seat or in the floor member opposing to the occupant seat, a distance from the waist line of the door to the door-open operating means is equal to or more than a length of a hand of a normal human being while maintaining an easiness of a door open operation by the occupant on the vehicle. Accordingly, it is impossible to operate the door-open operating means by forming a small space capable of inserting a hand, a tool or the like into the passenger room from the outside of the passenger room, and an excellent antitheft property is obtained.

In accordance with a second aspect of the present invention, as it depends from the first aspect, the occupant seat is constituted at least by a seat cushion, and a slide apparatus capable of moving the seat cushion forward and backward and capable of fixing the seat cushion at an appropriate position, the slide apparatus is provided with a driving means capable of moving the seat cushion forward and backward, a stopper means capable of fixing the seat cushion at front and rear appropriate positions, and a vehicle state detecting portion detecting an exit state of an occupant, and the vehicle state detecting portion controls the driving means so as to move to a position covering the door-open operating means and be allowed to be stopped by the stop means at the position, when the vehicle state detecting portion detects the exit state of the occupant.

According to the invention as stated in the second aspect, since the vehicle state detecting portion controls the driving means so as to move to the position covering the door-open operating means and be allowed to be stopped by the stop means at the position, when the occupant gets out of the vehicle and the vehicle state detecting portion detects the exit state of the occupant, it is possible to securely prevent the door-open operating means from being operated.

In accordance with a third aspect of the present invention, as it depends from the first or the second aspect, the occupant seat is constituted at least by a seat cushion, a slide apparatus freely moving the seat cushion forward and backward, capable of fixing seal cushion at an appropriate position and capable of moving to a frontmost position covering the door-open operating means, and a walk-in means for always energizing the seat cushion to a front side, and the occupant seat freely moves to the frontmost position of the slide apparatus by activating the walk-in means when the occupant gets out of the vehicle.

According to the invention as stated in the third aspect, since the seat cushion is urged to the front side so as to move to the frontmost position of the slide apparatus by activating the occupant seat in a walk-in manner when the occupant gets out of the vehicle of the vehicle, the door-open operating means can be securely covered by the seat cushion, and it is possible to securely prevent the door-open operating means from being operated from the outside of the passenger room.

In accordance with a fourth aspect of the present invention, as it depends from any one of the first to the third aspects, the vehicle state detecting portion is set so as to activate the driving means at a time of detecting a fact that the door latch means is operated from an unlocked state to a locked state from the outside of the passenger room.

According to the invention as stated in the fourth aspect, since the vehicle state detecting portion is set so as to activate the driving means when the vehicle state detecting means detects the fact that the door latch means is operated from the unlocked state to the locked state from the outside of the passenger room, it is possible to securely detect the fact that the occupant gets out of the vehicle, there is no risk of a malfunction, and a commodity property is improved.

In accordance with a fifth aspect of the present invention, as it depends from any one of the first to the fourth aspects, the vehicle state detecting portion is set so as to activate the driving means at a time of detecting a fact that the occupant is away from the passenger room.

According to the invention as stated in the fifth aspect, since the vehicle state detecting portion is set so as to activate the driving means when the vehicle state detecting portion detects the fact that the occupant is away from the passenger room, it is possible to securely detect the fact that the passenger gets out of the vehicle, there is no risk of a malfunction, and a commodity property is improved.

In accordance with a sixth aspect of the present invention, as it depends from any one of the first to the fifth aspects, the vehicle state detecting portion is set so as to activate the driving means at a time of detecting a fact that no load is applied to a pressure detection type sitting sensor provided in the seat cushion.

According to the invention as stated in the sixth aspect, since the vehicle state detecting portion is set so as to activate the driving means when the vehicle state detecting portion detects the fact that no load is applied to the pressure detection type sitting sensor provided in the seat cushion, it is possible to securely detect the fact that the passenger gets out of the vehicle, there is no risk of a malfunction, and a commodity property is improved.

In accordance with a seventh aspect of the present invention, as it depends from any one of the first to the sixth aspects, a covering means for covering the door-open operating means is provided in the seat cushion of the occupant seat.

According to the invention as stated in the seventh aspect, since the door-open operating means is covered with the covering means provided in the seat cushion, the door-open operating means is completely invisible from the outside of the passenger room, an opportunity for generating a wicked attempt is lost, and an antitheft property is significantly improved.

DETAILED DESCRIPTION OF THE PREFERRED EMBODIMENTS

There will be detailed below the preferred embodiments of the present invention with reference to the accompanying drawings. Like members are designated by like reference characters.

The object, of providing the vehicular electrical disengaging door latch apparatus which can not operate a door-open operating means of a mechanical lock canceling mechanism by forming a small space capable of inserting a hand or a tool or the like into a passenger room (an occupant room) from the outside of the passenger room, is achieved by a vehicular electrical disengaging door latch apparatus according to the present invention. Namely, the vehicular electrical disengaging door latch apparatus according to the present invention includes at least: a striker provided in the vehicle main body or the door, the door latch means provided in the door or the vehicle main body so as to freely engage with and disengage from the striker, the latch disengaging means capable of electrically disengaging the door latch means, the control means capable of controlling the latch disengaging means, and a door-open operating means capable of mechanically disengaging the door latch means by other transmitting means than the latch disengaging means. Especially, the door-open operating means is arranged in the lower side of the seat cushion of the occupant seat or in the floor member opposing to the occupant seat.

Embodiment 1

A description will be given of a first embodiment in accordance with the present invention with reference to FIGS. 1 to 5.

Figure 1:
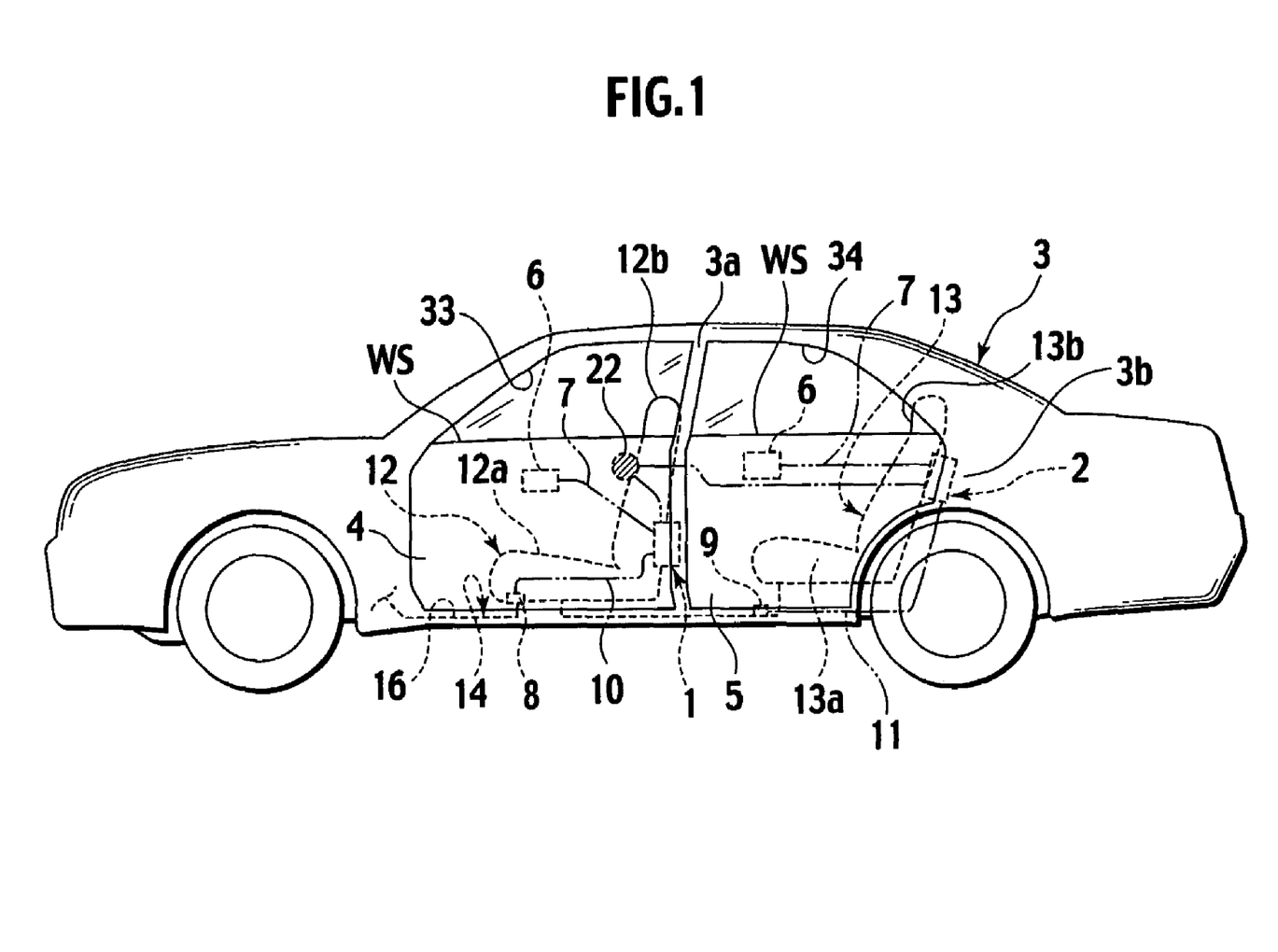
FIG. 1 is a side elevational view showing a motor vehicle provided with a door latch means in accordance with a first embodiment of the present invention.

Reference numerals 1 and 2 denote door latch means as door latch modules respectively provided in a center pillar 3a and a rear side panel 3b of a vehicle main body 3 so as to be freely engaged with and disengaged from strikers (not shown) placed in a front door 4 and a rear door 5.

Reference numeral 6 denotes a latch disengaging means as a latch disengaging module which is coupled to the door latch means 1 and 2 via a wire harness 7 and can fully open by electrically disengaging the door latch means 1 and 2. A control module (not shown) which can control the latch disengaging means 6 and an operation switch (not shown) which can be operated from the inside of a passenger room (an occupant room) are interposed in the latch disengaging means 6.

Figure 2:
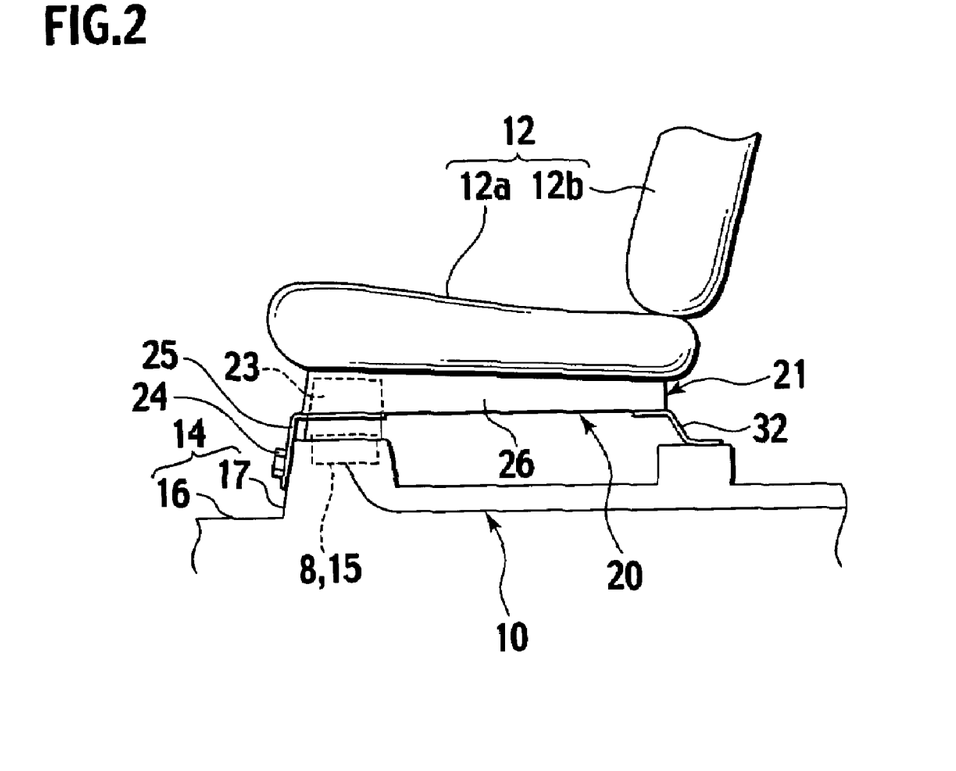
FIG. 2 is a side elevational view showing a box provided with a front seat and a door-open operating means in FIG. 1.
Figure 3:
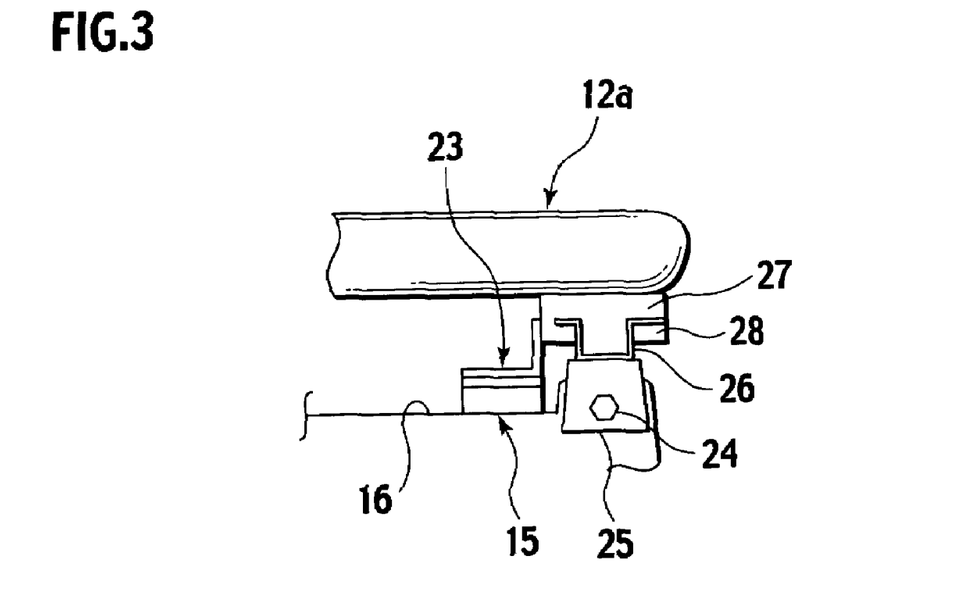
FIG. 3 is a front elevational view showing the box provided with the front seat and the door-open operating means in FIG. 2.
Figure 4:
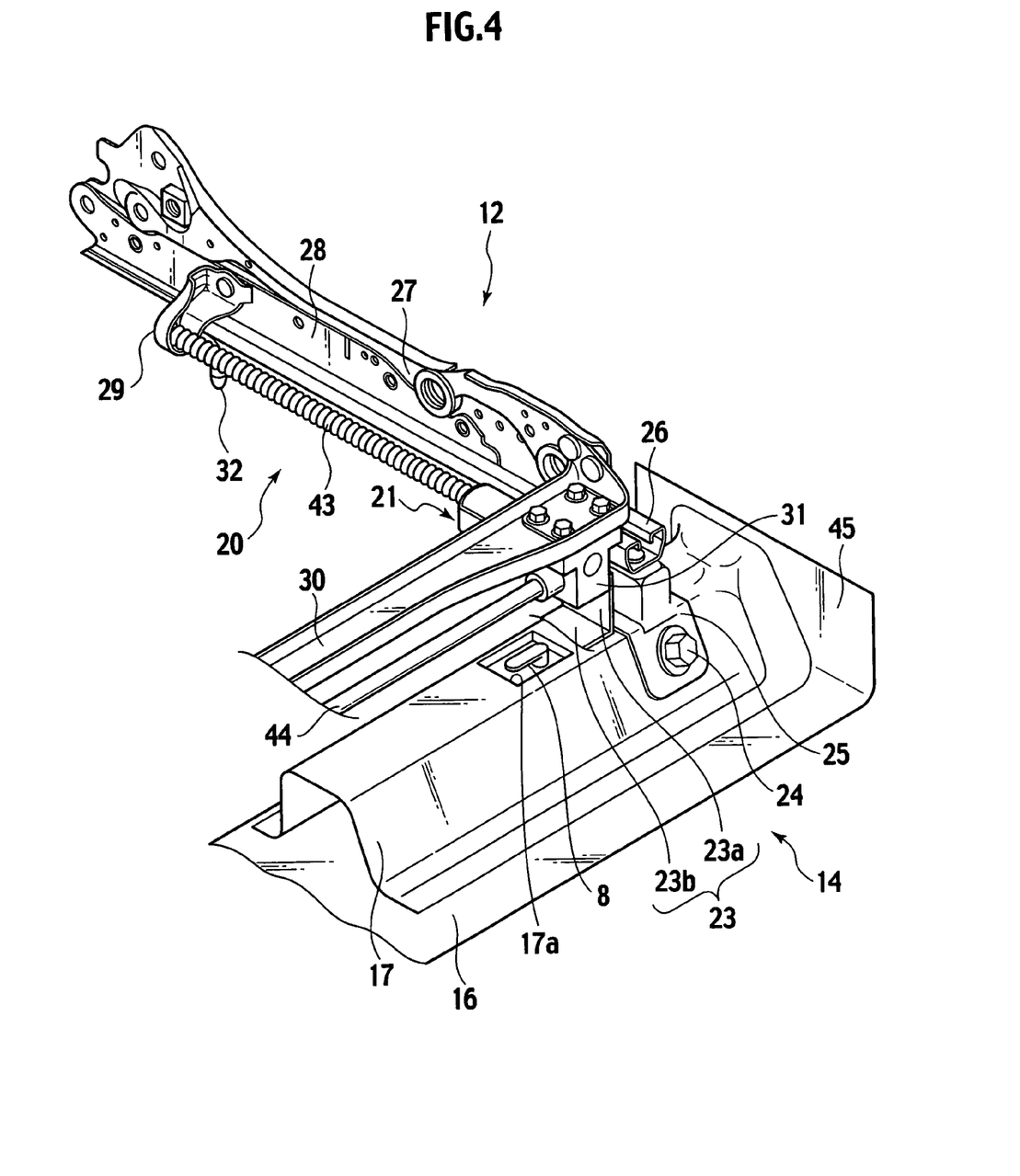
FIG. 4 is a perspective view showing the box provided with the front seat and the door-open operating means in FIGS. 2 and 3.
Figure 5:
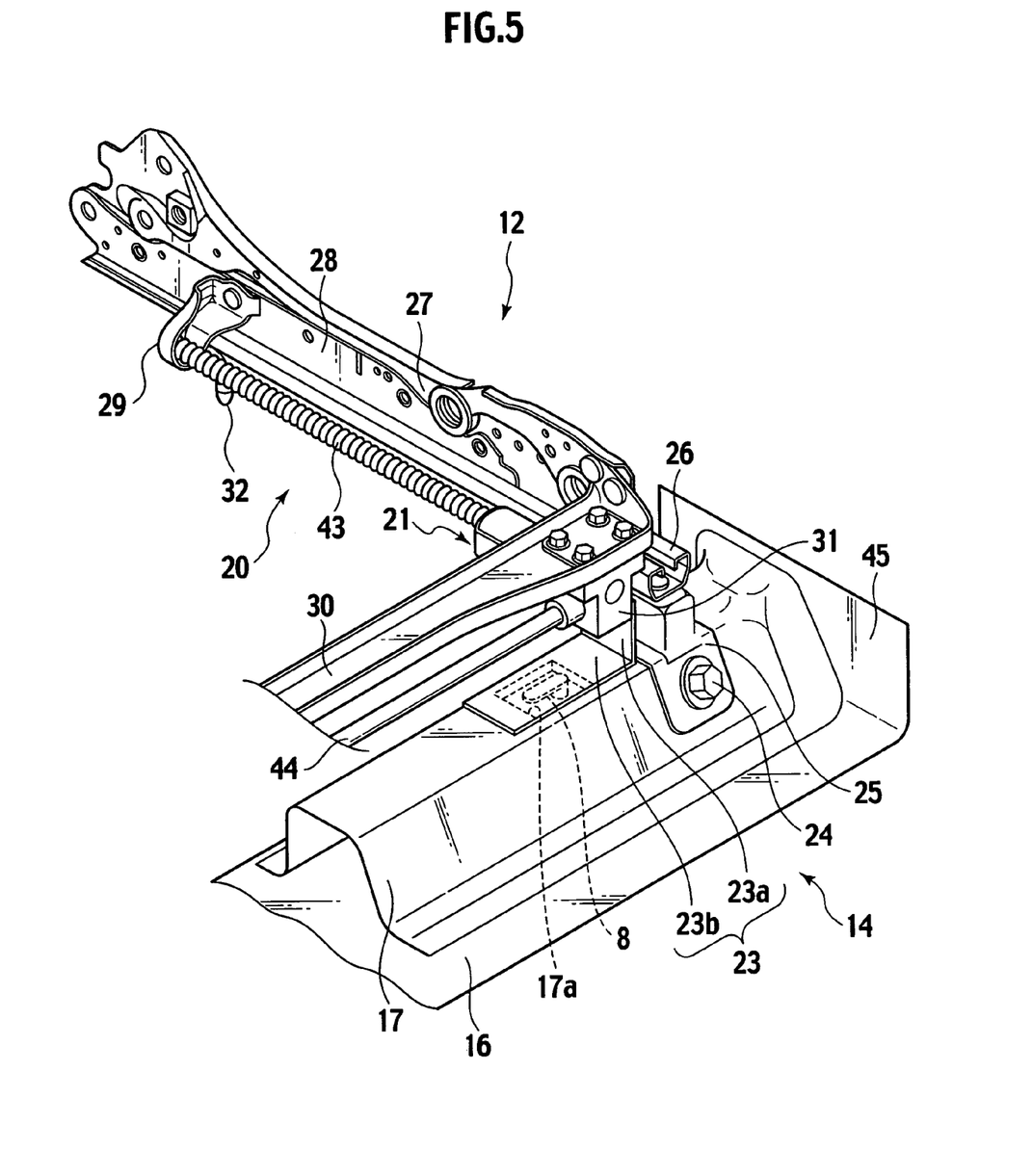
FIG. 5 is a perspective view showing a state in which the door-open operating means in FIG. 4 is covered with a covering means.

Reference numerals 8 and 9 denote door-open operating means as door-open operating modules which can respectively disengage the door latch means 1 and 2 mechanically by other transmitting means 10 and 11 constituted by a cable than the latch disengaging means 6. The door-open operating means 8 and 9 are arranged within a box 15 arranged in a floor member 14 which exists in lower sides of seat cushions 12a and 13a of a front seat 12 and a rear seat 13 as respectively an occupant seat and opposing to the front seat 12 and the rear seat 13 (in this case, the rear box is not illustrated), and are formed in a lever shape as shown in FIGS. 4 and 5 which an occupant (not shown) can operate. A description will be given in detail of the floor member 14 in which the box 15 is arranged. The floor member 14 is constituted by a floor panel 16 itself in which the door-open operating means 9 is arranged, and a cross member 17 which is supported to the floor panel 16 and in which the door-open operating means 8 is arranged. As shown in FIGS. 4 and 5, the door-open operating means 8 is arranged in a hole 17a provided in a top portion of the cross member 17.

The front seat 12 is constituted at least by a seat cushion 12a, a slide apparatus (a power slide apparatus) 20 which can move the seat cushion 12a forward and backward and can fix the seat cushion 12a at an appropriate position, a seat back 12b, and a covering means 23 which is suspended from the slide apparatus 20 of the seat cushion 12a. The covering means 23 includes a bracket portion 23a which is perpendicularly suspended, and a cover portion 23b as a cover which covers the door-open operating means 8.

The slide apparatus 20 is provided with a drive means (driving means) 21 as a driving module which can move the seat cushion 12a forward and backward, a stopper means (not shown) as a stopper module which can fix the seat cushion 12a at appropriate front and rear positions, and a keyless entry system 22 as a vehicle state detecting section which detects an exit state of an occupant. When the keyless entry system 22 detects the exit state of the occupant, in other words, when detecting a fact that the door latch means 1 and 2 are changed from an unlocked state to a locked state by operating from the outside of the passenger room by a portable device (not shown), the slide apparatus moves to a position covering the door-open operating means 8 by controlling the drive means 21 and can be stopped by the stopper means at the position.

The drive means 21 is constituted by a front bracket 25 which is fixed to the cross member 17 by a bolt 24, a rear bracket 32 which is supported to the floor panel 16, a fixed rail 26 which is built between the front bracket 25 and the rear bracket 32, a movable rail 28 which is supported to a side frame 27 (FIG. 3) of the seat cushion 12*a* and is supported to the fixed rail 26 so as to freely move forward and backward, a lead screw 43 which is supported to a transmission case 31 fixed to a bracket 29 (FIG. 4) protruding from the movable rail 28 and a main frame 30 of the seat cushion 12*a*, a motor (not shown) which drives the lead screw 43, and a transmission shaft 44 forming a vehicle width direction extended from the motor, and is structured so as to transmit a rotation power to the lead screw 43 forming a longitudinal direction by the transmission case 31. When stopping the motor, a function of the stopper means is provided.

The rear seat 13 is constituted at least by the seat cushion 13*a* and a seat back 13*b*.

Since the structure is made as mentioned above, the door-open operating means 8 and 9 are arranged within the box 15 provided in the cross member 17 in the lower side of the seat cushion 12*a* of the front seat 12 and within the box (not shown) provided in the floor panel 16 positioned just below the seat cushion 13*a* of the rear seat 13. Accordingly, since distances from respective waist lines WS of the front door 4 and the rear door 5, that is, lower edges of windows 33 and 34 to the door-open operating means 8 and 9 are equal to or more than a length of a hand of a human being while maintaining an easiness of a door open operation of the door-open operating means 8 and 9 by the occupant on the vehicle, it is impossible to operate the door-open operating means 8 and 9 by such a small space that a hand, a tool or the like can be inserted into the passenger room, that is, by a hole formed by breaking the windows 33 and 34 or the like, so that an excellent antitheft property can be obtained.

Further, since the distance from the waist line WS is further elongated by arranging the door-open operating means 8 and 9 close to a center of the passenger room, for example, in a floor tunnel 45 side as shown in FIGS. 4 and 5, a more excellent antitheft property is obtained.

Further, when the occupant gets out of the vehicle of the vehicle and operates the keyless entry system 22, whereby the exit state of the occupant is detected, the door-open operating means 8 is moved to a covered position by controlling the drive means 21 and can be stopped by the stopper means at the position. Accordingly, it is possible to securely prevent the door-open operating means 8 from being operated.

In other words, since the structure is made such that the drive means 21 is activated when the keyless entry system 22 detects a fact that the door latch means 1 is operated from the unlocked state to the locked state from the outside of the passenger room, it is possible to securely detect the fact that the occupant gets out of the vehicle, there is no risk that a malfunction is generated, and a commodity property is improved.

Further, since the door-open operating means 8 is covered with a covering means 23 provided in the seat cushion 12*a* of the front seat 12, the door-open operating means 8 is absolutely invisible from the outside of the passenger room, an opportunity for generating a wicked attempt is lost, and an antitheft property is significantly improved.

Embodiment 2

Figure 6:
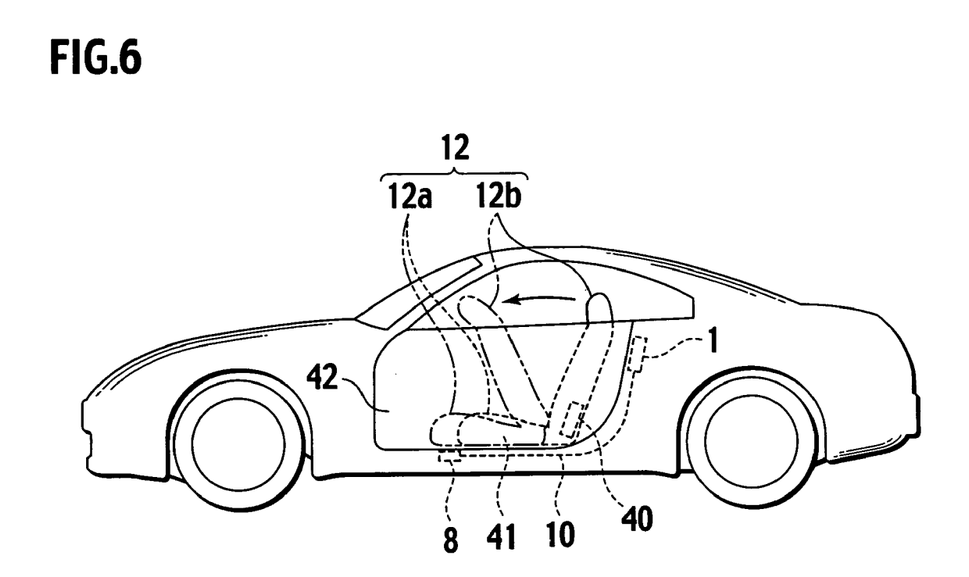
FIG. 6 is a side elevational view showing a motor vehicle provided with a door latch means in accordance with a second embodiment of the present invention.

A description will be given of a second embodiment in accordance with the present invention with reference to FIG. 6. The same reference numerals and names are used in the same constituting members as those in the first embodiment, and an overlapping description will be omitted.

Reference numeral 40 denotes a exit switch, which is provided in a lower side of the front seat 12 (for example, the seat back 12*b*). When the exit switch 40 is operated, the front seat 12 is structured such that the seat cushion 12*a* can move to a frontmost position covering the door-open operating means 8 by a walk-in means (not shown) as a walk-in module which always urges the seat cushion 12*a* to a front side. At this time, the seat back 12*b* flops into a front side as shown by a two-dot chain line. A slide apparatus 41 in which the walk-in means is arranged is movable forward and backward and can be fixed at an appropriate position. When the occupant gets in (gets on) the vehicle again, the exit switch 40 is reset to an operable state by opening a door 42 so as to reset the front seat 12 to an original position, and the door-open operating means 8 becomes in an operable state.

In accordance with the structure mentioned above, since the seat cushion 12*a* is urged to the front side so as to move to the frontmost position of the slide apparatus 41 by operating the exit switch 40 and activating the front seat 12 in a walk-in manner when the occupant gets out of the vehicle, the door-open operating means 8 is securely covered with the seat cushion 12*a*, and it is possible to securely prevent the door-open operating means 8 from the outside of the passenger room on the basis of the simple structure without necessity of a complex system such as a power slide apparatus or the like.

Embodiment 3

Figure 7:
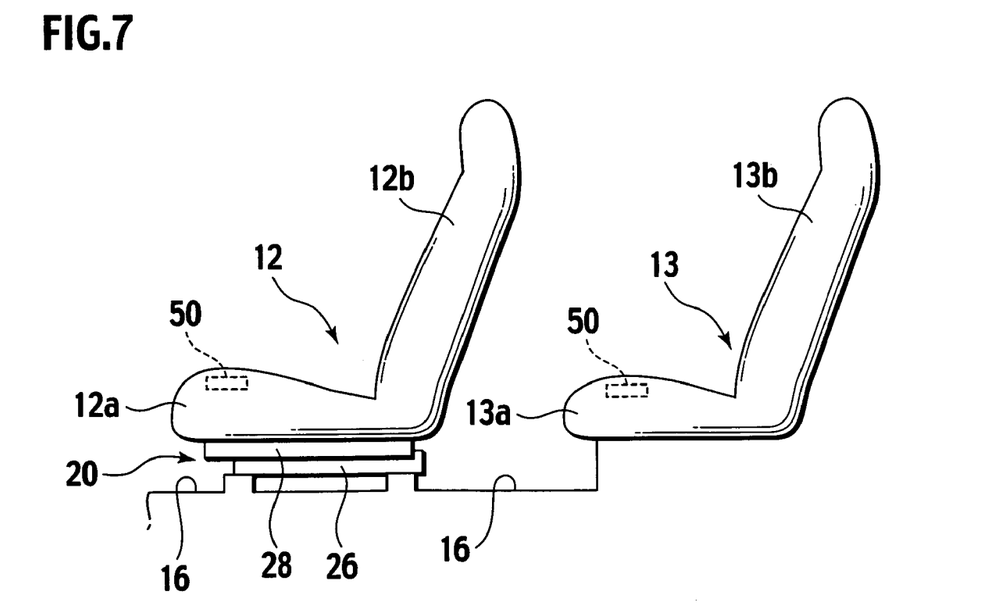
FIG. 7 is a side elevational view showing a seat provided with a vehicle state detecting portion in accordance with a third embodiment of the present invention.

A description will be given of a third embodiment in accordance with the present invention with reference to FIG. 7. The same reference numerals and names are used in the same constituting members as those of the first embodiment, and an overlapping description will be omitted.

Reference numeral 50 denotes a pressure detection type sitting sensor as another "vehicle state detection section". The pressure detection type sitting sensor 50 is provided in the seat cushions 12*a* and 13*a*, and is set so as to determine that the occupant is absent from the passenger room at a time of detecting a state in which no load is applied to the seat cushions 12*a* and 13*a*, thereby activating the drive means 21.

In accordance with the structure mentioned above, since the structure is made so as to activate the drive means 21 at a time of detecting the state in which no load is applied to the seat cushions 12*a* and 13*a* when the occupant gets out of the vehicle, that is the fact that the occupant is absent from the passenger room, it is possible to securely detect the fact that the occupant gets out of the vehicle, there is no risk that the malfunction is generated, and the commodity property is improved.

In the embodiments mentioned above, both of the front door 4 and the rear door 5 can rotate around the well-known hinge (not shown) in the front side so as to open and close the door, however, the present invention also can be applied to a slide door. Further, as the means for detecting the exit state of the occupant by the vehicle state detection section, it is possible to utilize a pyroelectric type infrared ray sensor detecting an infrared ray energy or an ultrasonic sensor can be utilized without being limited to the sitting sensor.

The entire contents of Japanese Patent Application P2004-227984 (filed on Aug. 4, 2004) are incorporated herein by reference.

Although the invention has been described above by reference to certain embodiments of the invention, the invention is not limited to the embodiments described above. Modifications and variations of the embodiments descried above will occur to those skilled in the art, in light of the above teachings. The scope of the invention is defined with reference to the following claims.

What is claimed is:

1. A vehicular electrical disengaging door latch apparatus, comprising:
    a door latch module provided in a door or a vehicle main body for engaging and disengaging the door and the vehicle main body;
    a latch disengaging module for electrically disengaging the door latch module;
    a door-open operating module provided at one of a lower side of a seat cushion of an occupant seat or a floor member opposing the occupant seat, the door-open operating module for mechanically disengaging the door latch module; and
    a vehicle state detection section for detecting whether an occupant is on an occupant seat or not,
    wherein the occupant seat comprises a seat cushion and a slide apparatus capable of moving the seat cushion forward and backward,
    wherein the slide apparatus is provided with a driving module capable of moving the seat cushion forward and backward, and
    wherein when the vehicle state detection section detects that the occupant is not on the occupant seat, the vehicle state detection section causes the driving module to move the occupant seat to a position where the occupant seat covers the door-open operating module.

2. The vehicular electrical disengaging door latch apparatus according to claim 1,
    wherein the occupant seat comprises: a seat cushion; a slide apparatus freely moving the seat cushion forward and backward, capable of fixing seat cushion at an appropriate position and capable of moving to a frontmost position covering the door-open operating module; and a walk-in module always biasing the seat cushion to a front side; and
    wherein the occupant seat freely moves to the frontmost position of the slide apparatus by activating the walk-in module when the occupant gets off from the vehicle.

3. The vehicular electrical disengaging door latch apparatus according to claim 1,
    wherein the vehicle state detection section actuates the driving module when the vehicle state detection section detects that the door latch module is changed from an unlocked state to a locked state from outside the vehicle.

4. The vehicular electrical disengaging door latch apparatus according to claim 1,
    wherein the vehicle state detection section causes the driving module to move the occupant seat to the position where the occupant seat covers the door-open operating module when the vehicle state detection section detects that the occupant is outside the vehicle.

5. A vehicular electrical disengaging door latch apparatus according to claim 1,
    wherein the vehicle state detection section is located in the seat cushion and detects that the occupant is not on the occupant seat when no load is applied to the vehicle state detection section.

6. A vehicular electrical disengaging door latch apparatus according to claim 5,
    wherein the vehicle state detection section comprises a pressure detection type sensor.

7. The vehicular electrical disengaging door latch apparatus according to claim 3,
    wherein the seat cushion of the occupant seat is provided with a cover which covers the door-open operating module to block access to the door-open operating module.

8. The vehicular electrical disengaging door latch apparatus according to claim 4,
    wherein the seat cushion of the occupant seat is provided with a cover which covers the door-open operating module to block access to the door-open operating module.

9. A vehicular electrical disengaging door latch apparatus according to claim 5,
    wherein the seat cushion of the occupant seat is provided with a cover covering the door-open operating module.

* * * * *